United States Patent [19]
Beebe et al.

[11] Patent Number: 4,489,598
[45] Date of Patent: Dec. 25, 1984

[54] TIRE ROLLING RESISTANCE MEASUREMENT SYSTEM

[75] Inventors: James C. Beebe, Medina; Barry D. Cargould, Akron, both of Ohio

[73] Assignee: Eagle-Picher Industries, Inc., Cincinnati, Ohio

[21] Appl. No.: 492,644

[22] Filed: May 9, 1983

[51] Int. Cl.$^3$ ............................................. G01M 17/02
[52] U.S. Cl. ..................................................... 73/146
[58] Field of Search ................................. 73/146, 9, 7

[56] References Cited
U.S. PATENT DOCUMENTS

| | | | |
|---|---|---|---|
| 3,552,200 | 1/1971 | Hermanns et al. | 73/146 |
| 4,055,081 | 10/1977 | Honlinger | 73/146 |
| 4,366,707 | 1/1983 | Jarschel | 73/146 |

Primary Examiner—Donald O. Woodiel
Attorney, Agent, or Firm—Wood, Herron & Evans

[57] ABSTRACT

An arrangement for measuring the rolling resistance of tires. The arrangement includes a horizontal roadwheel and several horizontally rotatable tires which are urged against the roadwheel and rotated thereby. The tire spindle assembly is borne by a carriage which is movable toward and away from the roadwheel on a floating platform. The radial force with which the tire is urged against the roadwheel is offset by a linkage structure attached between the platform and the fixed base of the roadwheel assembly such that instantaneous rotation of the platform relative to the roadwheel base is about the axis of rotation of the roadwheel. The linkage structure includes a load cell for measuring the radial force. The arrangement further includes a load cell generally at the perimeter of the roadwheel which measures the tangential rolling resistance force of the tire.

9 Claims, 8 Drawing Figures

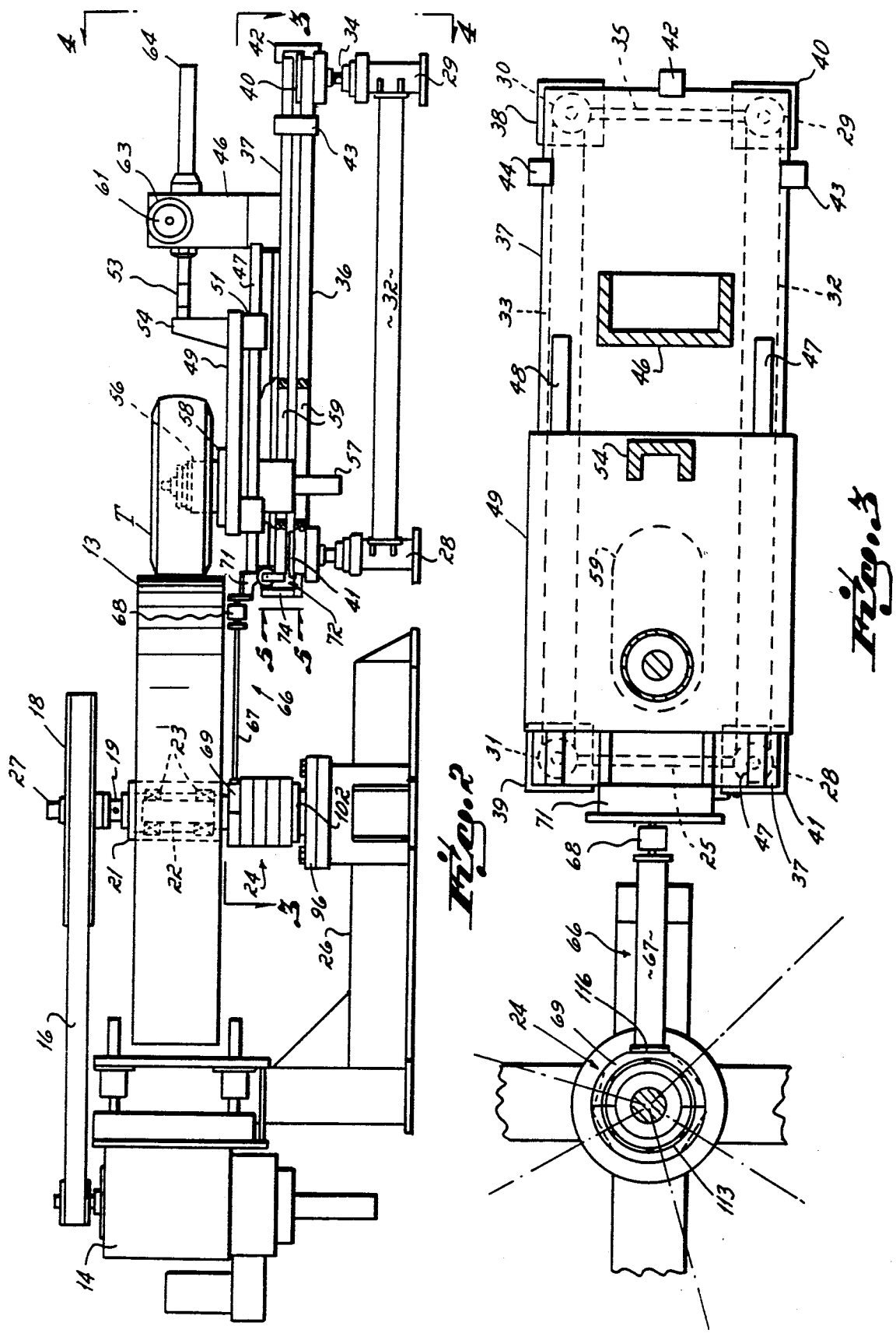

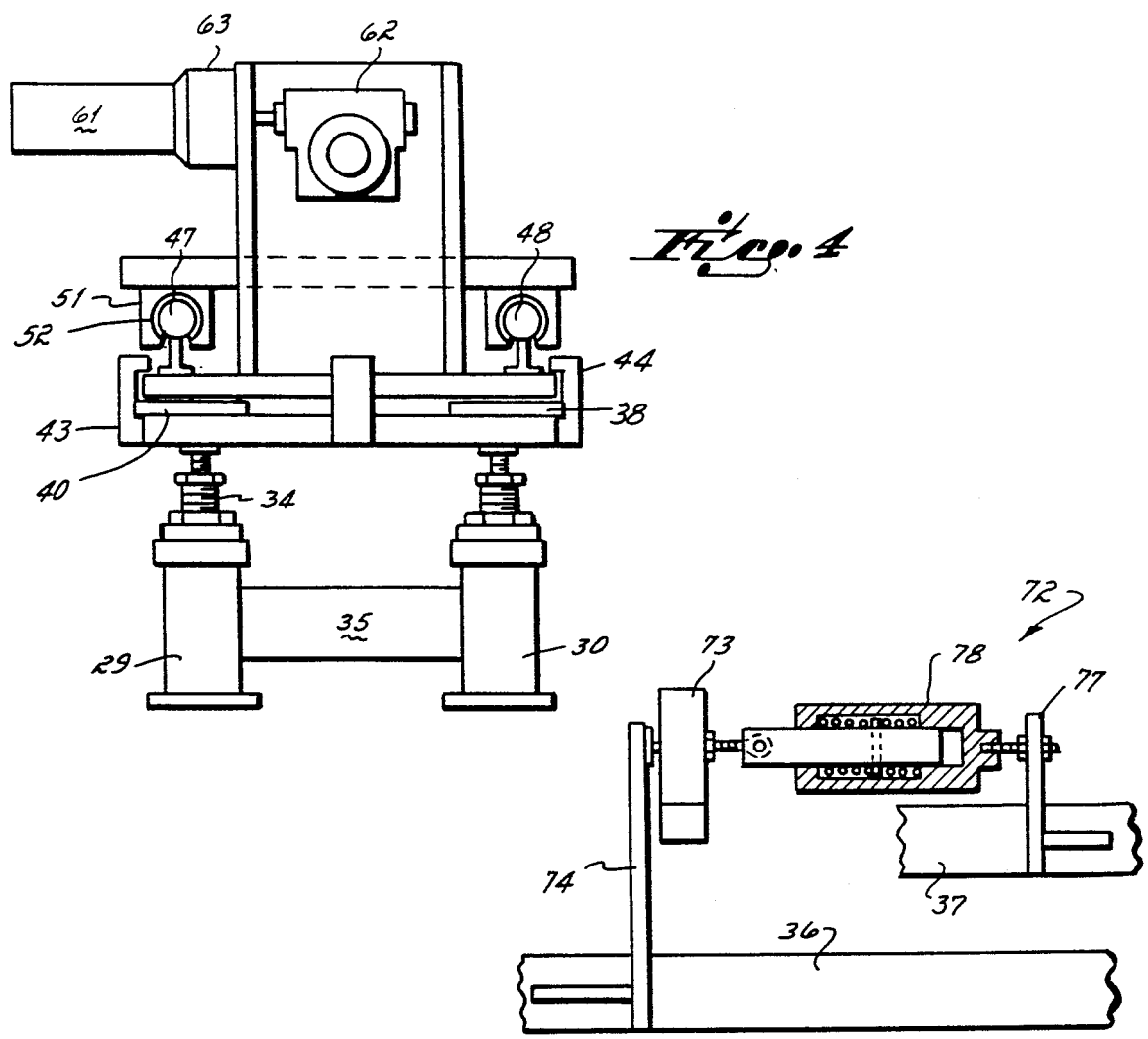
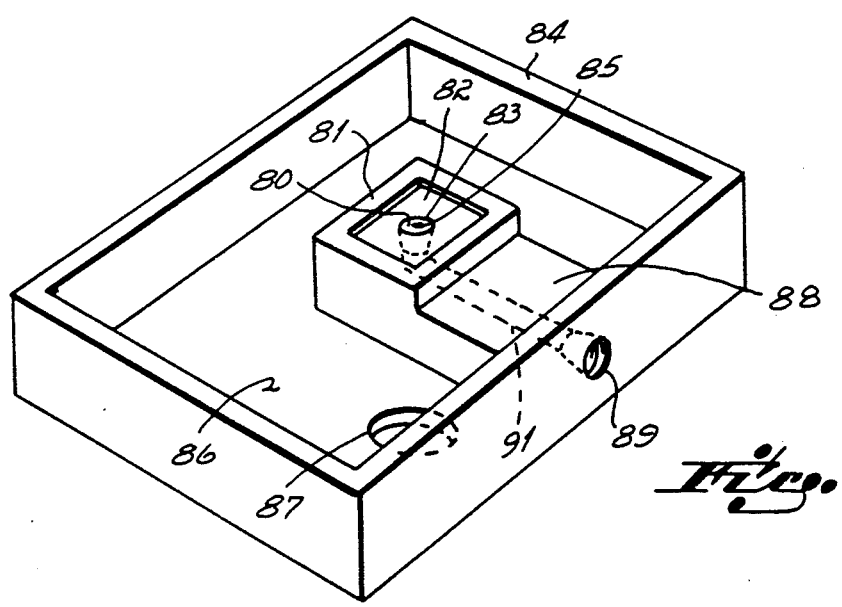

TIRE ROLLING RESISTANCE MEASUREMENT SYSTEM

DESCRIPTION OF THE INVENTION

This invention relates generally to tire testing systems and more particularly concerns a tire rolling resistance measurement arrangement. In measuring the quality and performance of tires, such as tires for trucks, cars and other vehicles, one parameter of interest is the rolling resistance of the tire. The rolling resistance is the tangential force between the tire and a surface along which it rolls, given a certain amount of radial force exerted therebetween. In measuring tire rolling resistance, typically a relatively massive roadwheel is rotated at a constant velocity, and a tire on a rotatable spindle is urged into contact with the periphery of the roadwheel.

Various techniques are then employed to obtain a measure of the tangential force, the rolling resistance, at the tire/roadwheel interface. In the most typical orientation, the roadwheel rotates at a constant velocity in a vertical plane about a horizontal axis, and the tire rotates in a vertical plane about a parallel horizontal axis. One means for determining the size of the force at the roadwheel/tire interface is to measure the power necessary to drive the road wheel, at its constant velocity, which is attributable to the introduction of the tire into contact with the roadwheel. The measurement of energy in this fashion is somewhat inaccurate and the measured energy includes energy attributable to a number of losses in the system in addition to the rolling resistance. In addition, only one tire can be measured at a time since there would be no way to apportion the amount of energy attributable to each tire if more than one tire were simultaneosly tested.

In another scheme, with the same general geometrical configuration, a torque cell is provided for the roadwheel to measure the increase in torque due to the loading of the road wheel by a tire. Again, only a single tire may be tested at a time and there are measurement inaccuracies such as that due to roadwheel bearing losses which cannot be separated from the effects of the rolling resistance on the measured torque.

In another prior art arrangement, using a similar vertical tire and roadwheel configuration, a second tire can be simultaneously tested. The second tire is moved into contact with the roadwheel on the opposite side of the wheel from the first tire. A biaxial load cell is provided at the spindle of each tire in order to measure a radial force and a force at right angles to the radial force, which is the tangential force, or the rolling resistance. In this system, it is extremely difficult to properly align the load cell of each tire and spindle assembly to ensure that the load cell is truly measuring a radial force and a force perpendicular to the radial force. In other words, it is difficult to ensure that the first measured line of force is truly radial. If it is not, the error introduced into the "tangential" force can be substantial due to the angles involved. Since the true rolling resistance is typically a small percentage (for example, 1%) of the radial loading force, if the load cell is misaligned so that a portion of the axial loading force is interpreted as rolling resistance force, the percentage error in rolling resistance is significant. If the direction of axial force measurement by the load cell differs from the true radial direction by an angle A, for example, the rolling resistance force measurement is affected by an amount equal approximately to the load force multiplied by the sine of the angle A.

In addition to the alignment error, there are errors due to the cross talk of the load cell. Even when the load cell is loaded with a perfectly aligned radial force, an output is generated in the tangential channel of the load cell even though no tangential load is applied. This is the effect of cross talk. This effect is partially a function of radial load applied. The function relating radial load and tangential channel output is typically nonlinear and hysteretic. These characteristics make this type of error difficult to correct. These errors become significant because of the difference in magnitude of the measured forces. Cross talk also causes an error in the radial load channel from an applied tangential load, but it is not usually significant because the smaller tangential load causes a smaller error in the larger range radial channel.

Another two-tire rolling resistance measuring method is the external carriage reaction method. In this case, with the tires and roadwheel oriented vertically as before, each tire is mounted on a carriage and urged toward the roadwheel. The axis of rotation of the tire is itself rotatable about a pivot axis external of the tire and the roadwheel, with the pivot axis being aligned with the axes of rotation of the road wheel and the tire. The torque about this pivot axis is then taken as an indication of the rolling resistance of the tire. There is a difficulty in this technique, again, with proper alignment in the application of the radial loading force on the tire to assure that a portion of the radial force is not interpreted as rolling resistance.

Another difficulty in this technique is in the tare value. The tire and carriage create a sizeable apparent rolling resistance due to their weight. This tare value must be measured and subtracted from the value recorded during the test to arrive at the rolling resistance value. However, when the tire deforms under load, the center of gravity of the tire moves causing its moment arm to change. This causes a change in the tare value. The amount of this change, while not easily measurable, is an error in the final rolling resistance value.

Another rolling resistance measurement method, termed the internal carriage reaction method, has a general geometrical configuration similar to that of the external carriage reaction method. However, in this case, the carriage for each tire provides for rotation of the tire and tire axis about the axis of rotation of the roadwheel. The rolling resistance of each tire is derived from a measurement of the torque of its associated carriage about the axis of rotation of the road wheel. As in the case of the external carriage reaction method, there is a problem with displacement of the tire relative to the load wheel upon loading. Due to the vertical orientation of the tire, the application of gravitational forces will vary dependent upon displacement of the tire. Another problem is that any frictional force in the pivot of the tire axis about the axis of rotation of the roadwheel is an error included in the measurement.

All of the above-described, vertically oriented, rolling resistance measurement systems which involve the use of load cells to derive the rolling resistance typically use a single load cell for deriving the parameter of interest, whether it be torque or force. Due to the vertical orientation of the tire and roadwheel, gravitational forces are introduced requiring a load cell having a considerable range, thereby limiting the accuracy of the load cell measurement, except in the torque method, which is at best at a level of accuracy of a fraction of a percentage of the full load range of the load cell.

Horizontal rolling resistance measuring systems, those in which one or more tires and the roadwheel rotate in horizontal planes, are known, but so far as applicants are aware, they have been of the force method type. Therefore, the biaxial load cell alignment difficulties ascribed earlier to the force method of measuring rolling resistance are still present. This horizontal array does, however, eliminate the tare load difficulties due to gravitational forces.

It has been an objective of this invention, therefore, to provide a rolling resistance measuring arrangement having improved accuracy over the prior art systems described above. This objective has been accomplished in accordance with certain principles of the invention by providing a rolling resistance measurement arrangement utilizing a driven road wheel which engages one or more tires which are driven by the roadwheel, with the tires and roadwheel rotating in a horizontal plane about a number of substantially vertical axes. In this arrangement, each tire is rotatable on a spindle assembly on a carriage which is movable toward and away from the perimeter of the roadwheel. The carriage is movable along a free-floating platform which is coupled to the non-rotating base of the roadwheel by a linkage structure such that the instantaneous rotation of the platform relative to the road wheel base is about the axis of rotation of the roadwheel and is at very low static friction. Means are then provided for measuring the force perpendicular to this radial force line established by the linkage to provide a measure of the rolling resistance force.

In the disclosed embodiment of the invention, the radial linkage structure includes a radial force measuring load cell. The tangential, rolling resistance, force is measured by a tangentially oriented load cell coupled between the road wheel base and the platform substantially at the periphery of the roadwheel where it contacts the tire.

In the above-described rolling resistance measurement system, it has been learned that not only must the platform axis of rotation closely coincide with the axis of rotation of the roadwheel, but also the pivot about that axis must have very low static friction for optimum performance. In the embodiment of the invention which shall be described in detail herein, this desired low friction pivot is provided by low static friction hydrostatic oil bearings having rotational centers substantially at the axis of rotation of the road wheel.

Other objects and advantages of the invention, and the manner of their implementation, will become apparent upon reading the following detailed description and upon reference to the drawings, in which:

FIG. 2 is a view of the arrangement of FIG. 1 taken along the line 2—2 and in the direction of the arrows;

FIG. 3 is a sectional view of a portion of the arrangement of FIG. 2 taken along the line 3—3;

FIG. 4 is an end view of the measurement station of FIG. 2 taken along the line 4—4;

FIG. 5 is an enlarged view, partially in section, of the rolling resistance force measurement structure of a station of FIG. 2;

FIG. 6 is an enlarged perspective view of one of the platform hydrostatic oil bearings of the structure of FIG. 2;

Figure 1:
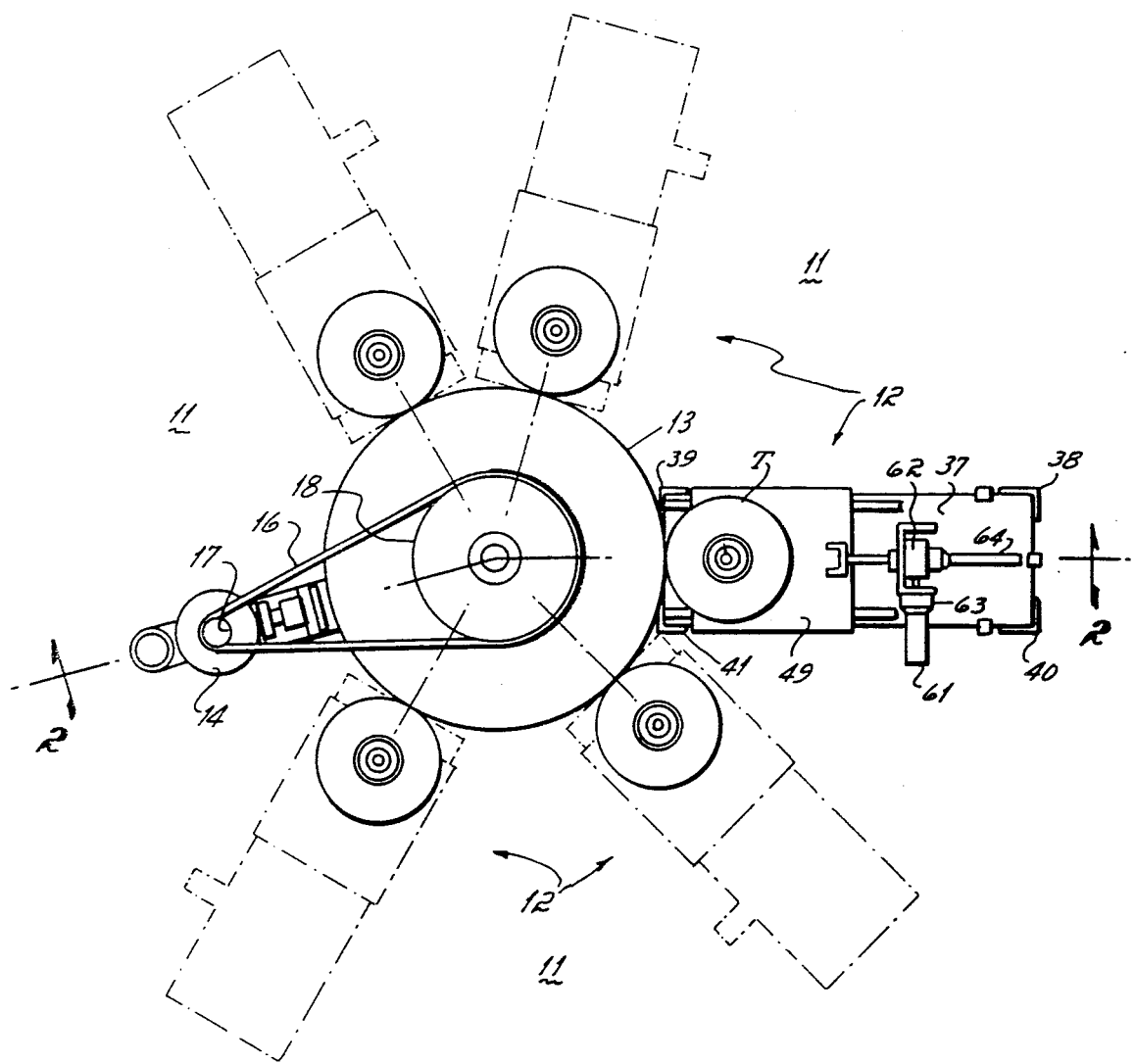
FIG. 1 is a top plan view of a rolling resistance measuring arrangement in accordance with the present invention having five measurement stations.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents and alternatives falling within the spirit and scope of the invention as defined by the appended claims.

Turning first to FIG. 1, a tire rolling resistance measurement arrangement 11 in accordance with the present invention includes a number of rolling resistance measurement stations 12 and a driven roadwheel 13. The number of stations 12 may be as few as one and as many as is practical depending upon the relative sizes of the tires to be measured and of the roadwheel 13. In the illustrated form, there are five stations 12 so that the rolling resistance of up to five tires may be measured simultaneously.

With additional reference to FIGS. 2, 3 and 4, the roadwheel 13 is driven at a constant velocity by a motor 14. In the particular drive illustrated, the motor 14 is a dc motor driving a belt 16 in the nature of a timing belt which is engaged on a motor sprocket 17 and a roadwheel sprocket 18. In one contemplated form of the roadwheel assembly, the motor 14 is a 30 horsepower dc motor driving a 67.227 inch diameter road wheel to produce surface speeds at the periphery of the road wheel on the order of zero to 75 miles per hour.

The roadwheel drive sprocket 18 is rigidly attached to a torque sensor 19, which is in turn rigidly attached to a collar 21 on the roadwheel 13. The driven sprocket 18 therefore drives the roadwheel 13 for rotation on a fixed spindle 22, which is provided with appropriate bearings 23. The spindle 22 is mounted on a base 24 which is fixed to a framework 26 upon which the motor 14 is also mounted.

The torque sensor 19 is not pertinent to the present invention, but may be provided to give an indication of the total torque on the roadwheel. The torque signal from the sensor 19 is coupled to a slip ring arrangement 27 for connection to a suitable read-out device. The rotational speed of the roadwheel 13 may be controlled by setting the speed of the motor 14 using a speed potentiometer and tachometer (not shown).

Each station 12 of the tire rolling resistance measurement assembly includes a base made up of four support pillars 28, 29, 30 and 31 attached in a fixed position relative to the frame 26 and base 24. The supports 28, 29, 30 and 31 are interconnected by a pair of rigid tubular braces 32, 33 and a pair of rigid beams 25, 35. Leveling jacks 34 are fixedly mounted atop each support 28, 29, 30 and 31 and in turn support a table 36. The leveling jacks 34 are adjustable to place the table 36 into an orientation in which it is substantially horizontal. Additional supports and leveling jacks may be added for increased stability, if desired.

A platform 37 is substantially free floating on the table 36 through the action of oil bearings 38, 39, 40 and 41. The movement of the floating platform 37 is limited by stops attached at various points on the periphery of the table. For example, a stop 42 is located at an end of the table, and lateral stops such as 43 and 44 are provided along the sides of the table. Referring additionally to FIG. 6, each oil bearing 38–41 includes a central bearing pad portion having a peripheral wall 81. The wall 81 has a substantially flat upper surface and surrounds a slightly lower oil-receiving area 82. An extremely low static friction bearing surface for the floating platform 37 is provided by the flow of oil from an opening 83 in the area 82, filling the area 82 and flowing over the perimeter wall 81.

Surrounding the pad portion of the oil bearing is an oil trap structure defined by peripheral walls 84 and a bottom 86. The oil flowing over the perimeter walls 81 of the pad portion of the oil bearing is retained in the trap structure within the walls 84 and flows by gravity through an opening 87 in the bottom 86 of the oil trap. The pad portion of the platform oil bearing is formed from a metal block which has a portion 88 extending into contact with one of the outer walls 84 of the oil trap structure. In order to supply oil to the pad portion of the oil bearing, an oil supply hole 89 in the wall 84 communicates with a bore 91 through the block 88 and into communication with the oil hole 83 in the pad portion of the oil bearing.

In the illustrated rolling resistance measuring apparatus, each oil bearing 38, 39, 40 and 41 extends laterally beyond the edge of the table so that appropriate oil collecting tubing or piping (not shown) may be coupled to the oil bearing trap opening 87.

The oil supply opening 83 in the pad portion of the oil bearing is threaded and receives a threaded plug 80 having a small diameter opening 85 therethrough, through which the oil flows. In one present oil bearing construction, the pad portion of the oil bearing is square with the outer edge of each of the walls 81 being one and one half inches in length, while the periphery of the lowered oil-receiving area 82 is also square and five-eighths of an inch on a side. The opening 85 is 0.0135 inches in diameter, and the oil for the bearing is supplied at about 1,200 psi with a viscosity between 1,000 and 700 SUS (measured at 100° F.). Typical flow through the orifice during operation is about 0.1 gallons per minute.

Rigidly mounted on the platform 37 is a motor support framework 46 and a pair of skid shafts 47, 48 extending along the sides of the platform 37. A carriage 49 is movable along the rails 47, 48 toward and away from the roadwheel. The carriage 49 is mounted upon pillow blocks 51 which largely surround and ride along the skid shafts 47, 48, with intermediate ball bushings 52 therebetween.

In order to urge the carriage 49 toward and away from the roadwheel 13, a ball screw 53 is rotatably received in an upstanding bracket structure 54 rigidly attached to the rear of the carriage 49. Movement of the ball screw 53 away from the motor support 46 urges the bracket structure 54, and hence the carriage 49, towards the roadwheel 13.

A tire T to be tested is mounted on a wheel (not shown), which is secured to a tire spindle assembly indicated generally as 56. The tire T is rotatable in a substantially horizontal plane about a vertical axis through the center of a spindle 57 of the spindle assembly 56. The spindle assembly 56 includes a collar 58 which is secured to the carriage 49. The lower portion of the spindle assembly 56 is received within appropriate openings 59 in the platform 37 and the table 36 to permit the movement of the carriage 49 under the influence of the ball screw 53.

In order to move the carriage 49 relative to the platform 37, a ball screw motor 61 is mounted on the motor support 46 and drives the ball screw 53 through a ball screw jack 62, which is also mounted on the support 46. A brake 63 is provided for controlled stoppage of the advance or retraction of the ball screw 53, and a cover 64 is provided for the ball screw.

In order to move the tire T into engagement with the roadwheel 13, the ball screw 53 is advanced toward the road wheel, moving the carriage 49 and the tire relative to the platform 37 in the direction of the roadwheel. As thus far described, when the tire T contacts the roadwheel, a reactive force is produced tending to move the free-floating platform 37 rearwardly into engagement with the stop 42. In order to oppose this radial movement of the platform 37, a radial linkage structure designated generally as 66 is attached between the base 24 of the roadwheel and the platform 37. The radial linkage structure 66 includes a rigid plate 67 attached at one end to a load cell 68. The plate 67 is attached at its other end by means of a split ring oil bearing 69 (to be described hereinafter) to the base 24 of the spindle 22. The other end of the load cell 68 is attached to a bracket 71 which is in turn attached to the platform 37. The radial linkage structure 66 is substantially inextensible, and therefore maintains the platform 37 at a substantially fixed position relative to the roadwheel 13.

As the ball screw 53 moves the platform 49 toward the roadwheel 13, urging the tire into engagement therewith, the radial loading force applied to the carriage 49 produces a corresponding reaction force in the linkage structure 66, the value of which is indicated by the load cell 68. Therefore, the load force for the tire T, at which a rolling resistance measurement is taken, is established by moving the ball screw 53 to drive the tire into engagement with the roadwheel until the desired load force is measured by the radial force load cell 68.

The rolling resistance force is a force acting tangential to the perimeter of the roadwheel 13 at the contact point between the tire T and the roadwheel. As shall be discussed in more detail hereinafter, the linkage structure 66, and more particularly the oil bearing 69 thereof, serves to establish the instantaneous center of rotation of the freefloating platform 37 about the roadwheel base 24 substantially at the axis of rotation of the roadwheel and with very low static friction. Therefore, the rolling resistance force applied tangentially at the roadwheel/tire interface is at right angles to the radial loading force between the roadwheel and the tire T (and also to the reactive radial force acting through the radial linkage structure 66). This rolling resistance force tends to rotate the free-floating platform 37 about the roadwheel.

In order to maintain the platform 37 from being moved into engagement with the lateral stops such as 43 and 44, means are provided to produce a reactive force to counteract the rolling resistance force. This reactive structure, indicated generally as 72 (FIG. 5), produces a reactive force in a line substantially perpendicular to that of the radial load force. This perpendicular reactive force is of a size to balance the torque produced by the rolling resistance force applied at the perimeter of the roadwheel 13. Therefore, for example, if the reactive force is applied interiorly of the perimeter of the roadwheel, the force is proportionately greater than the rolling resistance. In order to measure this reactive force, which is proportional to the rolling resistance, a force measuring device is interposed between the fixed base 24 and the floating platform 37 along this perpendicular force line.

In the present instance, the force measuring device is a load cell 73, contained in the reactive structure 72, which is located substantially at the periphery of the road wheel 13 along the radial force line established by the linkage structure 66. The structure 72 comprises a rigid strut 74 attached to the table 36 generally at the periphery of the road wheel 13. Rigidly attached to the upper end of the arm 74 is the load cell 73, with the strut and load cell lying substantially at the perimeter of the roadwheel. The other side of the load cell 73 is coupled to a bracket 77 extending from and rigidly attached to the platform 37. The force line established between the load cell and strut 74 and the platform bracket 77 is substantially perpendicular to the radial force line through the linkage structure 66.

In the illustrated form of the invention, a spring assembly 78 is interposed along the tangential force line between the load cell 73 and the bracket 77. Although the spring 78 yields to some degree, the equilibrium force measured by the load cell 73 remains the rolling resistance force. The spring 78 is provided merely to change the natural frequency of the system to a frequency below the range of tire test frequencies.

Figure 7:
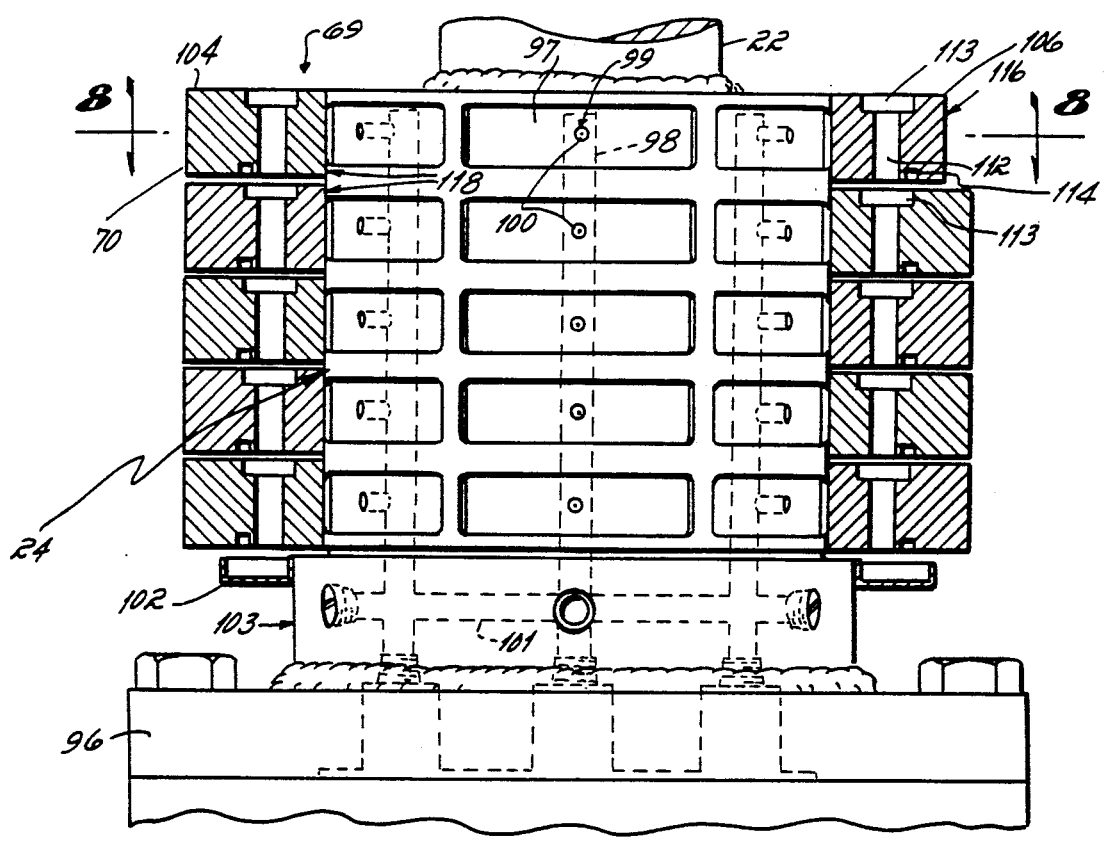
FIG. 7 is an enlarged elevational view of the road wheel spindle assembly and oil bearings of the structure of FIG. 2.
Figure 8:
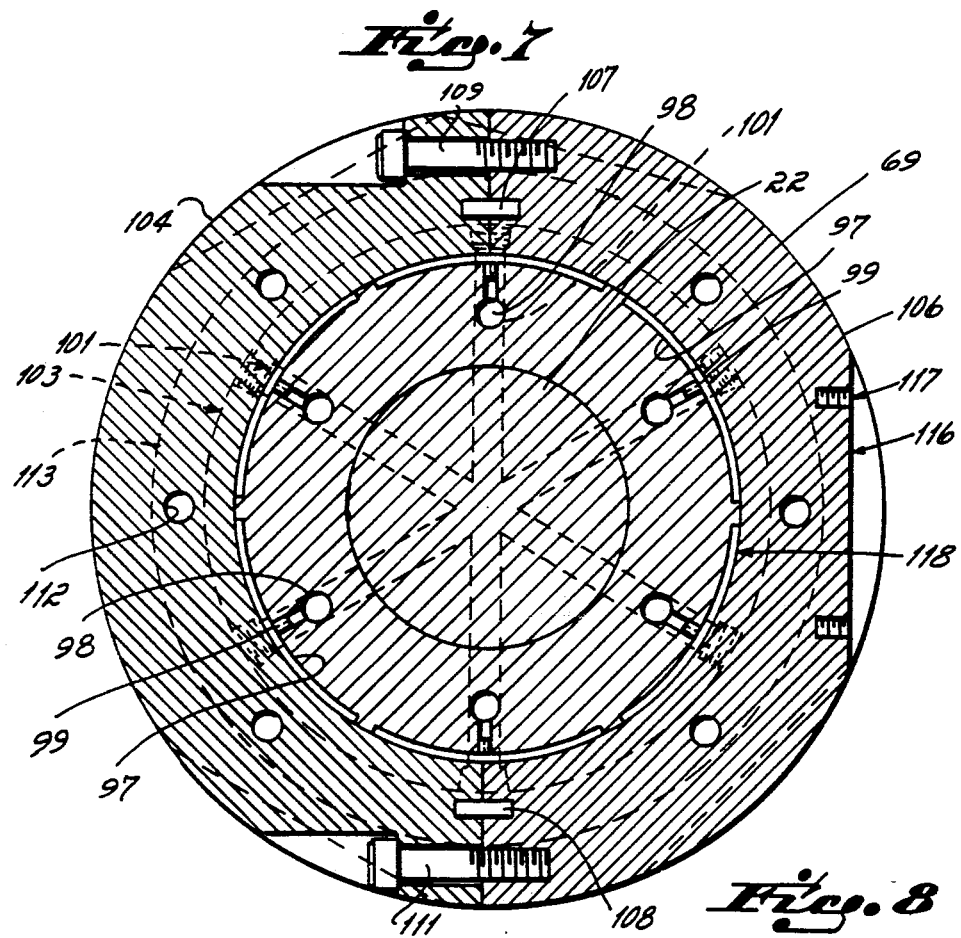
FIG. 8 is a sectional view along the line 8—8 of FIG. 7.

With reference now to FIGS. 7 and 8, the split ring oil bearing structure 69 at the base 24 of the spindle assembly for the roadwheel shall be considered in more detail. In the illustrated form of the spindle and base structure, the spindle 22 is welded within the hollowed out cylindrical base 24, which is in turn welded to a disc-shaped plate 96, which permits bolting the spindle arrangement to the machine framework 26.

In order to form the oil bearing structure 69 for each of the five stations 12, five sets of recessed areas 97 are formed in an annular fashion about the periphery of the base 24. These recessed areas 97, in cooperation with their surrounding walls, form the pad portion for the bearing rings 70 of the oil-bearing structure 69 in order to provide a very low static friction bearing surface between the rings and the base of the roadwheel spindle assembly.

In order to supply oil to the recessed areas 97 on the spindle base 24, an oil supply opening 99 is provided centrally of each such area in communication with one of six bores 98 serving as oil manifolds. Each opening 99 receives a threaded plug 100 having a small (such as 0.0135 inches) diameter opening therein.

Six radially extending bores 101 near the bottom of the spindle base 24 extend from the outer edge of the base, past and in communication with one of the oil manifolds 98, terminating at a common opening generally at the center of the bottom of the base. In practice, one of these channels 101 is coupled to a pressurized oil source, and the other five openings are plugged. The lower end of each of the oil manifold passages 98 is also plugged, so that the only oil flow is through each of the orifices in the openings 99. An annular collection pan 102 is mounted about the periphery of the bottom portion 103 of the spindle base 24 to collect the oil flowing by gravity downwardly between the spindle base 24 and the bearing rings. The oil flows from the collection tray through tubing coupled to openings in the side wall of the tray (not shown).

The split ring assembly 70 provided for each of the five stations 12 includes two ring portions 104 and 106. The two halves of the split ring 70 are mated together using alignment pins 107, 108, and bolted together using bolts 109, 111, each of which is threadedly received in the ring portion 106. Six axial oil drain holes 112 are provided in an annular oil trap 113 provided in the upper surface of each of the rings 98. On the underside of each ring, an annular groove 114 is provided exteriorly, in a radial direction, of the holes 112 to serve as a drip barrier to prevent oil from migrating to the outer edge of the ring. The oil flowing through these drain holes is collected in the pan 102.

A flat 116 is provided on the periphery of the ring portion 106 and contains threaded bores 117 to which the end of the bar 67 of the radial linkage structure is attached. Preferably, the interior surface 118 of each ring 70 is machined to a tolerance of at least 0.001 inches to assure substantial centering of the ring on the spindle base. When each split ring is assembled and attached to its respective station by the radial linkage structure, the linkage structure maintains the vertical location of the ring on the roadwheel spindle base 24. The oil bearing provides an extremely low static friction bearing for the instantaneous rotation of the platform about the roadwheel spindle axis.

What is claimed is:

1. An apparatus for measuring the rolling resistance of tires comprising:
   a cylindrical roadwheel rotatable on a base about a vertical axis in a horizontal plane and having a vertical tire-engaging surface about its perimeter;
   a member substantially free to rotate for at least a limited arc about substantially the same vertical axis as the roadwheel;
   a spindle assembly for receiving a tire for rotation in the horizontal plane about a vertical axis mounted on said rotatable member;
   means for reacting and measuring the moment of rotation of said rotatable member caused by rolling resistance of a tire under test;
   means for adjusting the distance between the roadwheel axis and the tire spindle axis so as to apply a radial load on a tire under test; and
   means for measuring the radial load applied to said tire under test.

2. The apparatus of claim 1 in which the member rotates about the roadwheel on a hydrostatic bearing.

3. The apparatus of claim 1 in which the means for reacting and measuring includes a force load cell at the periphery of the roadwheel oriented to measure tangential force.

4. An apparatus for measuring the rolling resistance of tires comprising:
   a cylindrical roadwheel rotatable on a base about a vertical axis in a horizontal plane and having a vertical tire-engaging surface about its perimeter;
   a spindle assembly for receiving a tire for horizontal rotation about a vertical axis;
   a table fixed relative to the roadwheel base;
   a platform freely slidable to at least a limited degree in a horizontal plane on the table;
   a carriage on the platform carrying the spindle assembly;
   means for moving the carriage relative to the platform in a horizontal direction toward and away from the road wheel perimeter;

a linkage structure coupled between the roadwheel base and the platform, the linkage structure being attached to the roadwheel base such that instantaneous movement of the platform relative to the roadwheel base is about the axis of rotation of the roadwheel on a low static friction bearing;

means, in the linkage structure, for measuring a radial reaction force indicative of the loading force on a tire; and means for measuring a force, perpendicular to the radial reaction force, indicative of the rolling resistance force of a tire.

5. The apparatus of claim 4 in which the radial reaction force measuring means comprises a load cell.

6. The apparatus of claim 5 in which the means for measuring a perpendicular force measures the force at the perimeter of the roadwheel, the measured force being substantially equal to the rolling resistance of a tire.

7. An apparatus for measuring the rolling resistance of tires comprising:

a cylindrical roadwheel rotatable on a base about a vertical axis in a horizontal plane and having a vertical tire-engaging surface about its perimeter;

a spindle assembly for receiving a tire for horizontal rotation about a vertical axis;

a table fixed relative to the roadwheel base;

a plurality of oil bearings on the table;

a platform freely slidable to at least a limited degree in a horizontal plane on the oil bearings on the table;

a carriage on the platform carrying the spindle assembly;

a ball-screw drive arrangement coupled between the platform and the carriage operable to move the carriage relative to the platform in a horizontal direction toward and away from the roadwheel perimeter;

a linkage structure coupled between the roadwheel base and the platform, one end of the linkage structure being attached to the platform;

an oil bearing ring structure coupled to a second end of the linkage structure positioned about the roadwheel base such that the instantaneous axis of rotation of the platform relative to the roadwheel is substantially coincident with the axis of rotation of the roadwheel itself, on a low static friction bearing provided by the oil bearing ring;

means, in the linkage structure, for measuring a radial reaction force indicative of the loading force on a tire; and means for measuring a force, perpendicular to the radial reaction force, indicative of the rolling resistance force of a tire.

8. The apparatus of claim 7 in which the radial reaction force measuring means comprises a load cell.

9. The apparatus of claim 8 in which the means for measuring a perpendicular force measures the force at the perimeter of the roadwheel, the measured force being substantially equal to the rolling resistance of a tire.

* * * * *